United States Patent [19]

Hay, II

[11] Patent Number: 5,046,718
[45] Date of Patent: Sep. 10, 1991

[54] FLOATING RING LABYRINTH-TYPE DYNAMIC SHAFT SEAL AND PROCESS FOR USING SAME

[75] Inventor: Robert A. Hay, II, Midland, Mich.

[73] Assignee: The Dow Chemical Company, Midland, Mich.

[21] Appl. No.: 458,019

[22] Filed: Dec. 28, 1989

[51] Int. Cl.$^5$ .............................................. F16J 15/447
[52] U.S. Cl. ........................................ 277/1; 138/40; 277/14 R; 277/53; 277/173; 277/174; 415/168.2; 415/230
[58] Field of Search ...................... 277/1, 14 R, 53, 56, 277/57, 135, 168, 173, 174, 176, 192, 193, 133, 198; 415/113, 174.5, 229, 230, 173.5, 159, 165, 168.2, 208.2; 239/498, 500, 501, 502, 504; 138/37, 40, 42, 44, 45; 384/99, 144, 466, 480, 901

[56] References Cited

U.S. PATENT DOCUMENTS

| 781,266 | 1/1905 | Bryan et al. |
|---|---|---|
| 2,714,045 | 7/1955 | Simenson. |
| 2,876,800 | 3/1959 | Kalff .................................... 138/40 |
| 3,001,806 | 9/1961 | Macks ............................. 415/230 X |
| 3,097,853 | 7/1963 | McHugh ......................... 277/135 X |
| 3,460,842 | 8/1969 | Pointer et al. |
| 4,046,388 | 9/1977 | Meyer .............................. 415/230 X |
| 4,103,905 | 8/1978 | Desmond et al. .............. 415/113 X |
| 4,130,287 | 12/1978 | Ritzie. |
| 4,155,558 | 12/1979 | Nakamura. |
| 4,383,720 | 5/1983 | Ernst ................................ 277/53 X |
| 4,411,437 | 10/1983 | Conti. |
| 4,426,088 | 1/1984 | Ernst ................................ 277/56 X |
| 4,477,090 | 10/1984 | Johansson et al. |
| 4,575,100 | 3/1986 | Hay, II et al. |
| 4,992,024 | 2/1991 | Heydrich .......................... 415/229 |

FOREIGN PATENT DOCUMENTS 996867 6/1965 United Kingdom ............... 384/901

Primary Examiner—William A. Cuchlinski, Jr.
Assistant Examiner—Scott W. Cummings

[57] ABSTRACT

A process for providing a seal around a reciprocating and/or rotating shaft as in an apparatus for manipulating a fluid at least in part by the rotary and/or reciprocal motion of the shaft, involving the insertion of substantially identically configured free-floating seal elements into the gap between the shaft and its housing, and the improved apparatus resulting therefrom.

23 Claims, 4 Drawing Sheets

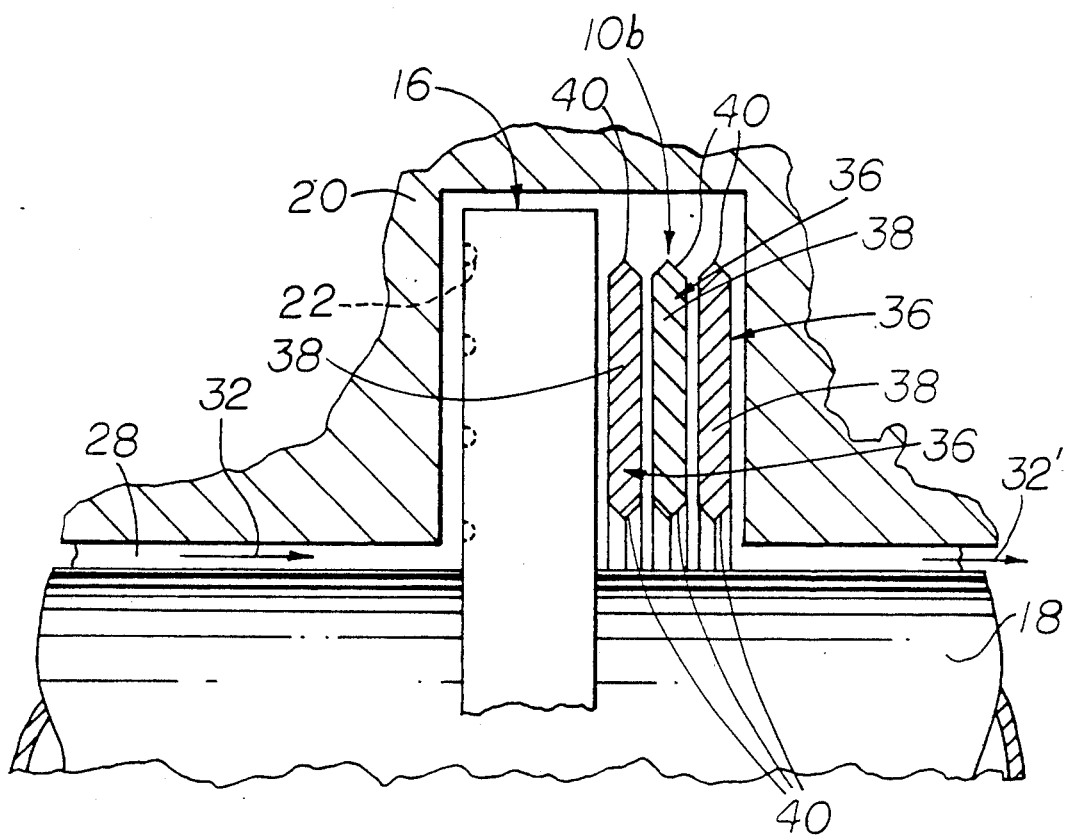
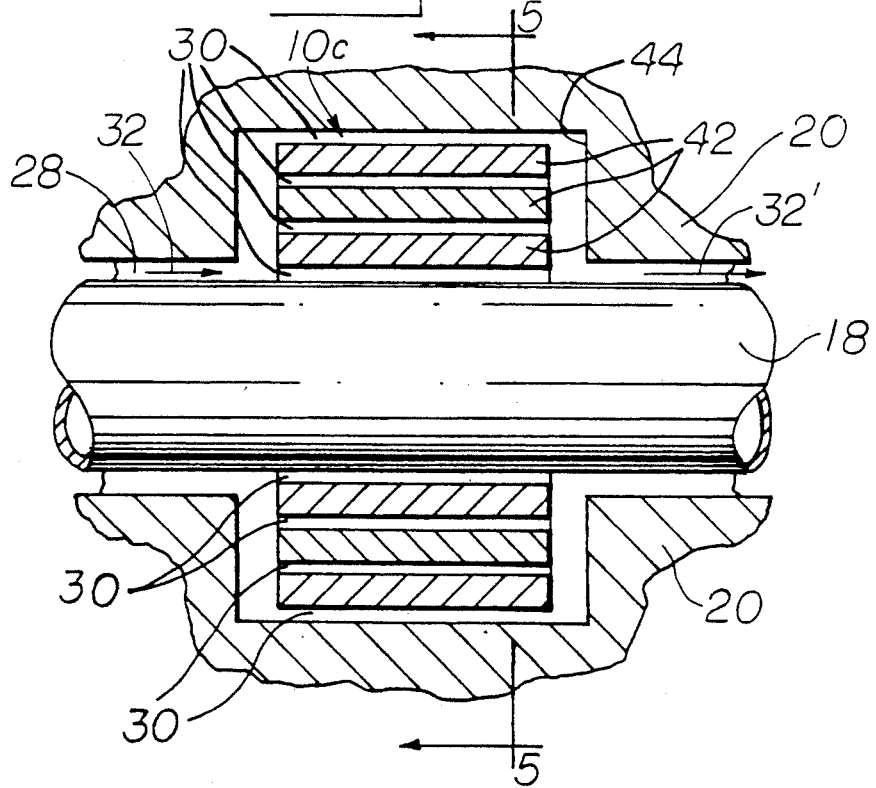

FLOATING RING LABYRINTH-TYPE DYNAMIC SHAFT SEAL AND PROCESS FOR USING SAME

BACKGROUND OF THE INVENTION

1. Field of the Invention

This invention relates to seals for use with rotating and/or reciprocating shafts, and more particularly for use with such rotating and/or reciprocating shafts in the mixing or pumping of highly viscous materials. In another aspect, the invention relates to a process for achieving a seal around a reciprocating and/or rotating shaft. In still another aspect, the invention relates to an improvement in apparatus for working or manipulating a fluid, particularly a highly viscous fluid, at least in part by the rotary and/or reciprocal motion of a shaft.

2. Brief Description of the Prior Art

Various seals have been developed in the past to allow adequate mechanical clearances and freedom of movement of reciprocating and/or rotating shafts in operation without at the same time creating avenues for excessive leakage of the materials being worked or manipulated and for contamination, some leakage however being inherent in any seal providing such clearances.

One variety of seal which has been developed is a tortuous-path type seal known as a labyrinth seal or labyrinth packing. The principal object of this type of seal is to lengthen the flow path of materials leaking from a pump or vessel along an operating shaft associated therewith, while still providing a channel for such flow whose height roughly corresponds to the total minimum required operating clearance between the shaft and its bore.

Generally speaking, these labyrinth seals comprise a series of flanges not in contact with one another alternately projecting from a shaft and the housing for the shaft and forming a single continuous labyrinthine gap. In addition to such other disadvantages as will be made apparent, these flanges, the shaft or portion of shaft carrying these flanges, and the portion of the housing so affected generally require sophisticated machining and/or materials which effectively restrict the range of applications in which these seals may be used.

Other devices have been developed also which distort or constrict the single continuous channel formed between a shaft and its stationary housing and corresponding to a certain mechanical clearance therebetween, see, e.g., Nakamura U.S. Pat. No. 4,155,558 and commonly-assigned Hay II et al. U.S. Pat. No. 4,575,100, the latter being hereby incorporated herein by reference. Each of these other devices of which Applicant is aware, however, possesses some disadvantage in terms of initial cost, complexity, frequency of maintenance or replacement, and/or effectiveness in providing a seal to contaminants or to the materials being worked or manipulated, particularly in high pressure differential applications.

It would be desirable if there were available a more effective seal for diminishing the leakage of plastified thermoplastic polymers and the ingress of contaminants, for example, along a reciprocating and/or rotating shaft, while providing the total required minimum clearance for the rotation and/or reciprocation of the shaft in normal operation.

It would also be desirable if such a seal were one which could be easily manufactured, maintained and/or replaced, and if such a seal were not susceptible to significant wear by frictional contact between elements of the seal, between the seal and housing or between the seal and shaft.

SUMMARY OF THE INVENTION

The present invention fulfills the above-referenced desires and overcomes the shortcomings of the prior art by providing a novel floating ring labyrinth-type seal assembly, novel and improved processes for achieving a seal around a reciprocating and/or rotating shaft, and an improved apparatus for manipulating a fluid at least in part by the rotary and/or reciprocal motion of such a shaft.

A generalized process of the present invention for achieving a seal around a reciprocating and/or rotating shaft broadly comprises the step of at least locally dividing a flow channel defined by an operationally required local clearance "h" between a shaft and a stationary member associated with the shaft into a plurality of flow subchannels of average dimension "h/n", where "n" is the number of flow subchannels locally so created. A process for achieving a seal with respect to the leakage of shear-thinning fluids in particular further comprises the step of at least locally expanding the flow channel or the plurality of flow subchannels, so that the clearance "h" in the case of shear-thinning fluids is made to exceed its original operationally required value.

These processes may be accomplished by employing the seal assemblies of the present invention in combination with the reciprocating and/or rotating shaft. A seal assembly constructed in accordance with the present invention generally broadly comprises means for at least locally dividing the aforementioned flow channel into the plurality of flow subchannels, and this dividing means in one embodiment comprises $(n-1)$ free-floating elements which are preferably substantially identically configured.

These elements may be in a number of configurations, but in the conventional apparatus where a generally annular flow channel is defined around the circumference of the shaft, these elements will preferably be concentric rings having a smallest inner diameter which is larger than the outer diameter of the shaft defining the flowchannel of local clearance h in combination with the housing. The number n of flow subchannels is thus in this conventional apparatus preferably uniform about the circumference of the shaft.

The improved apparatus offered by the present invention for manipulating a fluid at least in part by the rotary and/or reciprocal motion of a shaft utilizes the seal assemblies of my invention as described above to yield an apparatus which is less susceptible to admitting contaminants or leaking unacceptably high amounts of a fluid, and which insofar at least as the seals are concerned is generally more easily maintained and less costly to manufacture.

BRIEF DESCRIPTION OF THE DRAWINGS

FIG. 3 is a fragmentary cross-sectional view of an alternative embodiment of a seal assembly in relation to the shaft of FIGS. 1A, 1B.

FIG. 4 is a fragmentary cross-sectional view of still another embodiment of a seal assembly in relation to a shaft whose movement is principally reciprocal.

DETAILED DESCRIPTION OF THE PREFERRED EMBODIMENTS

Figure 1A:
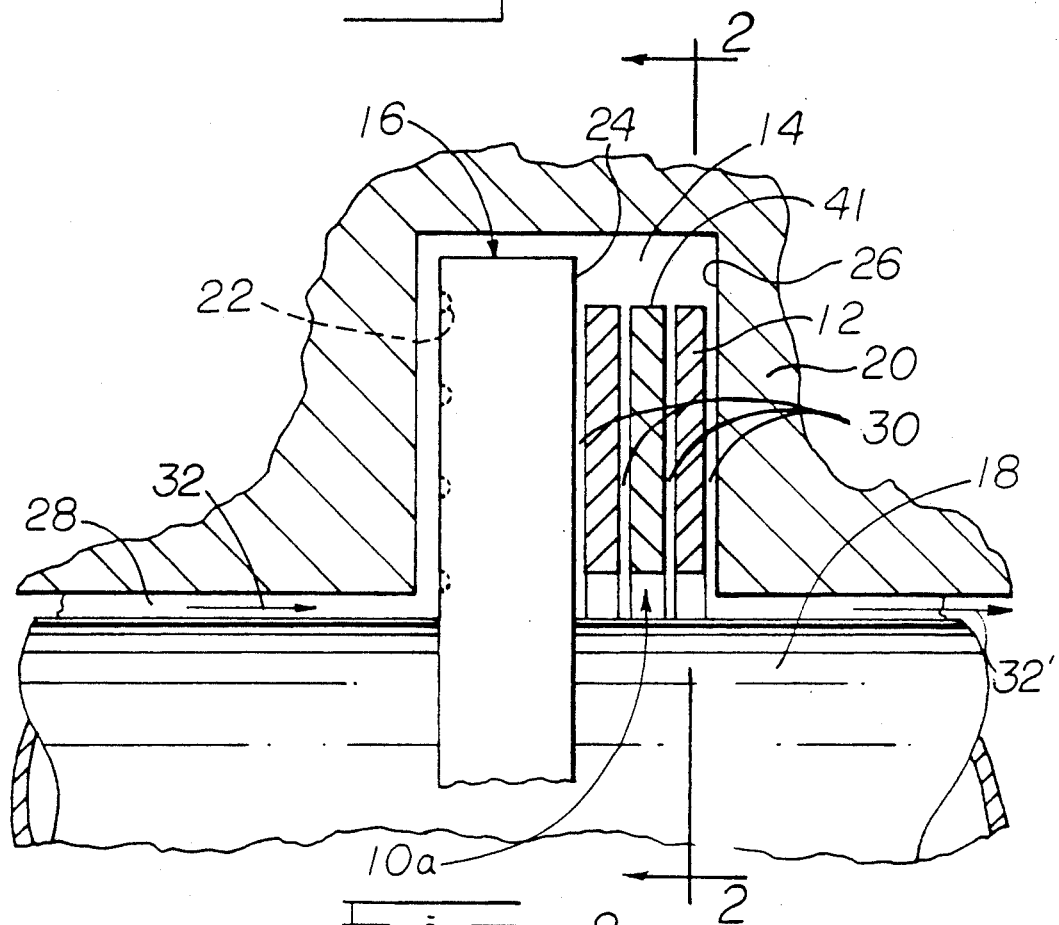
FIG. 1A is a fragmentary cross-sectional view of an embodiment of a seal assembly of the present invention in relation to a shaft whose movement is principally rotational.
Figure 1B:
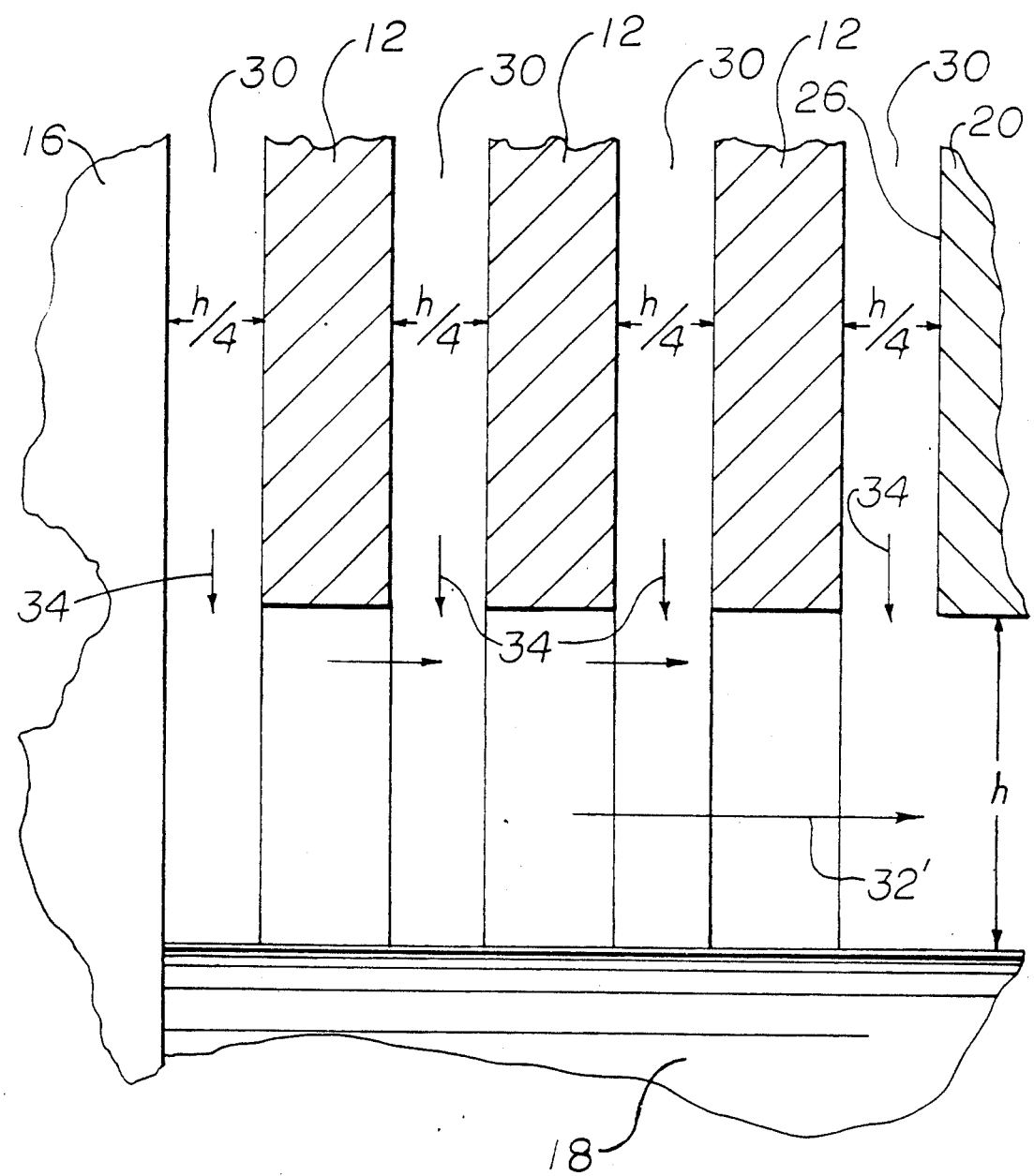
FIG. 1B is an enlarged view of a portion of the seal assembly embodiment shown in FIG. 1A.

Referring now to the drawings, a preferred embodiment of the seal assembly of the present invention is shown in FIGS. 1A and 1B and generally designated by 10a. As shown, the seal assembly 10a consists of 3 seal elements 12 which are located in a space 14 between a flange 16 extending from a generally cylindrical shaft 18 and a housing 20 associated with the shaft 18. The shaft 18, housing 20, and flange 16 with back pumping grooves 22 can be like those of the seal assembly disclosed in Hay et al. U.S. Pat. No. 4,575,100, and the various embodiments of the novel seal elements disclosed herein may be used in combination with the assembly of the referenced patent or with other known sealing assemblies or devices, or may be used alone to provide a desired sealing function.

Figure 2:
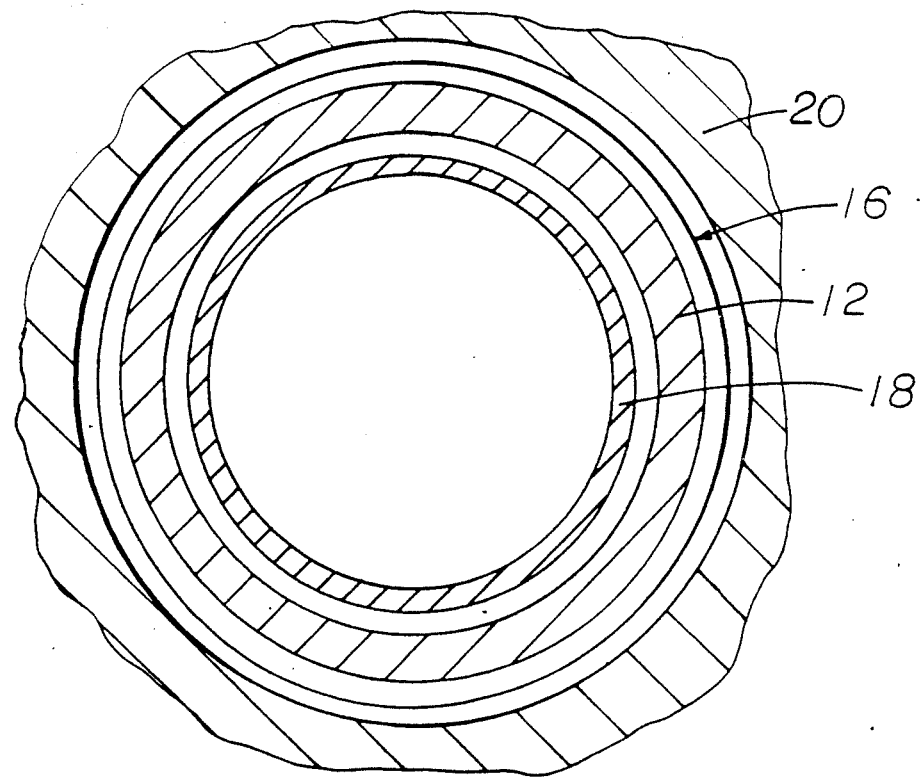
FIG. 2 is a view in section, taken along a line 2—2 in FIG. 1A, of the seal assembly and shaft depicted therein.

The seal elements 12 of FIGS. 1A and 1B are generally rectangular in cross-section, and preferably generally extend concentrically around a circumference of the shaft 18 in the form of rings having an inner diameter with respect to the shaft 18 that slightly exceeds the outer diameter of the shaft 18 around which the rings extend, as seen in FIG. 2. The seal elements 12 are shown in FIG. 1A in cross-section as parallel with one another, with an edge 24 of flange 16 and with an opposing wall 26 of the housing 20, as they would typically be during operation of the preferred apparatus.

It may be possible to use free-floating seal elements in this and subsequent embodiments which do not extend fully around a circumference of a shaft 18, but which extend only around a portion of the shaft 18. In this construction, it may also be possible to employ different numbers of such elements on a local basis (i.e., at various locations around the circumference of the shaft 18) with respect to the shaft 18 and a flow channel 28 defined by a clearance "h" between the shaft 18 and housing 20, so that a number "n" of flow subchannels 30 between a grouping of spaced seal elements 12 may not be uniform about a circumference of the shaft 18. This arrangement may be useful where the leakage along and around a shaft is disproportionately large in a given area or areas, but such an arrangement is not generally presently preferred.

The elements 12 effectively act as means to at least locally divide the flow channel 28 created by the clearance h seen generally in FIG. 1B between the flange 16 and shaft 18 and the housing 20 into a number of flow subchannels, and whether this division is accomplished with respect to the entire circumference of the shaft 18 or merely occurs locally can be seen to depend on whether the elements 12 responsible for the division extend around only a portion of the shaft 18 as just described. In the embodiments of the seal elements shown in the various figures, however, and with particular reference to FIGS. 1A, 1B, and 2, the elements 12 extend fully about the circumference of shaft 18, so that the elements 12 in FIGS. 1A, 1B, and 2 divide the flow channel 28 into the four substantially equal and concentric flow subchannels 30 of average dimension $h_1 = h/4$. The required total mechanical clearance h is thus maintained in any event for allowing movement of the shaft 16 during operation of the apparatus.

The flow channel 28 is generally annular in configuration as are the concentric flow subchannels 30, with the total leakage flow represented by an arrow 32 being generally along the shaft 18 and then normal to the shaft 18 and along flange 16, before leaking past the elements 12 and back along the shaft 18. The flows through the various subchannels are represented in FIG. 1B by the arrows numbered 34.

In operation, the total leakage flow represented by the arrow 32 is split into four flows 34 by the seal elements 12. It is known that for a non-shear thinning fluid the flow rate of the fluid through a channel is a geometric function of the height of the channel and a linear function of the length of the channel, as expressed by the equation $Q = fn(h^3/1)$, where Q is the flow rate, h is the height of the channel, and 1 is its length. Because the length of the subchannels 30 is the same as would have otherwise prevailed in the absence of elements 12, while the dimension $h_1$ of individual subchannels 30 is on the average one-fourth that of the flow channel 28, the total leakage flow 32' of the non-shear thinning fluid after passage through subchannels 30 is about $(\frac{1}{4})^3(4) = 1/16$th of that which would prevail in flow channel 28 absent the elements 12.

For shear-thinning fluids, the benefits in terms of a total reduced leakage flow 32' can be even more substantial than for non-shear thinning fluids. In considering how these benefits may be obtained, it will be appreciated that due to the free-floating nature of the elements 12, the division of flow channel 28 into four flow subchannels 30 of substantially equal dimension will mean that the difference in fluid velocities adjacent the flange 16, if present, or shaft 18 and adjacent a stationary housing 20 will be generally reflected in the fluid velocities at the boundaries of the flow subchannels 30.

Thus, for a shaft 18 rotating at an angular velocity "v" within a stationary housing 20, the thin element 12 nearest the shaft 18 will be rotating by virtue of the influence of the intervening fluid at an angular velocity of about $\frac{3}{4}$ v, the next element 12 at $\frac{1}{2}$ v, and the final, outermost element 12 at roughly $\frac{1}{4}$ v.

By virtue of the known direct relationship of shear rate to the velocity v and the inverse relationship of shear rate to the height h separating a surface moving with an incrementally greater velocity v compared to a second surface and that second surface, the relative shear rates of fluids in the various subchannels 30 will thus be substantially equal to one another and to that experienced with an undivided flow channel 28. Accordingly, while no decrease in shear-thinning occurs with the mere division of the flow channel 28 which would further reduce fluid leakage, no increase in shear-thinning should occur which would to any substantial degree offset the reduction in fluid loss due to pressure differences across flow subchannels 30.

The reader of ordinary skill will understand from the foregoing that the seal assembly of the present invention may be improved for shear-thinning fluids by the selection of a particular new total mechanical clearance $h_2$ in excess of the original required clearance h. A greater mechanical clearance $h_2$ between the shaft and its housing in the form of greater dimension between seal elements 12 would provide a concomitant reduction in shear rates and shear-thinning from that experienced in an undivided flow channel 30 or in individual flow subchannels 28, and thus a greater fluid viscosity and a greater resistance to leakage through the operating clearance which must otherwise be provided. A greater mechanical clearance would also provide a desirable additional degree of compliance for movements of the shaft 18 relative to the housing 20.

On the other hand, a greater mechanical clearance will provide a greater avenue for pressure flow according to the equation $Q = fn(h^3/l)$ set forth above, so that a balancing of the two contributions or influences on the overall total leakage flow 32' of the system is appropriate. This balancing can be accomplished using established relationships between shear rates and viscosities for various fluids, and by a simple iterative approach an optimum total mechanical clearance $h_2$ in excess of the original operationally required local clearance h may be found.

For an example of how this balancing might be undertaken, if a flow channel 28 of height h were simply split into four subchannels 30 of average height $h_1 = h/4$, the effect on flow apart from viscosity and shear-thinning considerations would be nominally as seen above, namely to reduce the total leakage flow 32' to about one sixteenth of its original value were the flow channel 28 not so split. Doubling the dimension $h_1$ between elements 12, so that $h_2 = 2h_1 = 2(h/4) = h/2$, the pressure flow through the flow subchannels 30 would then be about $4(\frac{1}{2})3 = \frac{1}{2}$ or one half of that which would be found in the undivided flow channel 28, without considering, again, viscosity and shear-thinning effects.

At the same time, the doubling of the dimensions $h_1$ between respective elements 12 to allow a greater overall mechanical clearance between the shaft 18 and a housing 20 (by using thinner elements 12 or repositioning or replacing the housing 20 and/or shaft 18 in a design of the apparatus, for example) will reduce the rate of shear of fluid flowing through flow subchannels 30 by one half as well from that seen in the unexpanded flow subchannels 30, so that the viscosity of the fluid in flow subchannels will be increased by an amount which can be determined by reference to a known relationship between shear rates and viscosities for that particular fluid.

Increasing the spacing between individual elements 12 to one and a half times their original spacing $h_1$, so that $3h_1/2 = 3h/8$, the pressure flow through the subchannels 30 apart from viscosity and shear-thinning considerations would be $4(\frac{3}{8})3 = 108/512$ or just over 1/5th of the flow entering the subchannels 30. The shear rate prevailing between individual elements 12 will, however, be reduced only by a third from that seen in the unexpanded channels, so that the viscosity for a given shear-thinning fluid will be increased by an amount which will ordinarily be somewhat smaller than where the gap between elements 12 is doubled. A comparison of the cumulative effects on the total leakage flow 32' for the two cases of doubling the dimension $h_1$ between elements 12 and of increasing the dimension $h_1$ by only one-half can be undertaken at this point to ascertain which offers a better seal to the shear-thinning fluid in question, and the process repeated for other incremental changes in the dimension $h_1$ between elements 12.

An important feature of the seals of the present invention is that the seals are virtually self-correcting with regard to their relative spacing and positioning within the space 14. Where because of movements of the flange 16 or shaft 18 relative to the housing 20 the distance between an element 12 and the flange 16, for example, is decreased or increased, the tendency of the remaining elements 12 will be to space themselves a substantially equal distance apart, where the forces caused by rotational shear and flow through subchannels 30 will be equalized on both sides of an element.

While some change in the total leakage flow rate might be expected during the initial period of imbalance with respect to that which would be experienced with steadily equal spacing between the elements 12, flange 16, and housing 20, it is expected that over a short period of time these differences will be dissipated such that the total leakage will again for non-shear thinning fluids be approximately one-sixteenth of that which would occur absent the division of flow channel 28 into four flow subchannels 30.

It should be noted that the elements 12 normally will be protected from significant frictional contact with one another or with the various other surfaces in question by the self-correcting nature of the elements 12 of seal 10a, so that frictional wear on the elements 12 is lessened also.

While the elements 12 of seal 10a are simply configured, easily manufactured, and fully adequate for purposes of the present invention, other configurations applying the same principles can be devised and employed as well. One such alternative configuration is shown in FIG. 3, wherein a seal assembly 10b is depicted having seal elements 36 which differ from the elements 12 of FIG. 1 only in cross-section. Whereas the elements 12 of FIG. 1 are substantially rectangular in cross-section, the elements 36 are best described as having a central substantially rectangular portion 38 with tapered end or peripheral edge portions 40, and preferably substantially symmetrically tapered end or peripheral edge portions 40 as shown.

One advantage that is envisioned for the configuration of the elements 36 relative to the configuration of the elements 12 is the reduced tendency toward accumulation of materials at the end portions 40 of the elements 36 compared to the ends 41 of the elements 12 (see FIG. 1A), due to the streamlining of the elements 36 with respect to fluid entering and exiting subchannels 30. The accumulation of thermally sensitive and degradable materials is of particular concern, and it is thus expected that where these materials are involved the elements 36 will normally be preferred to the elements 12 in the practice of the invention.

Figure 5:
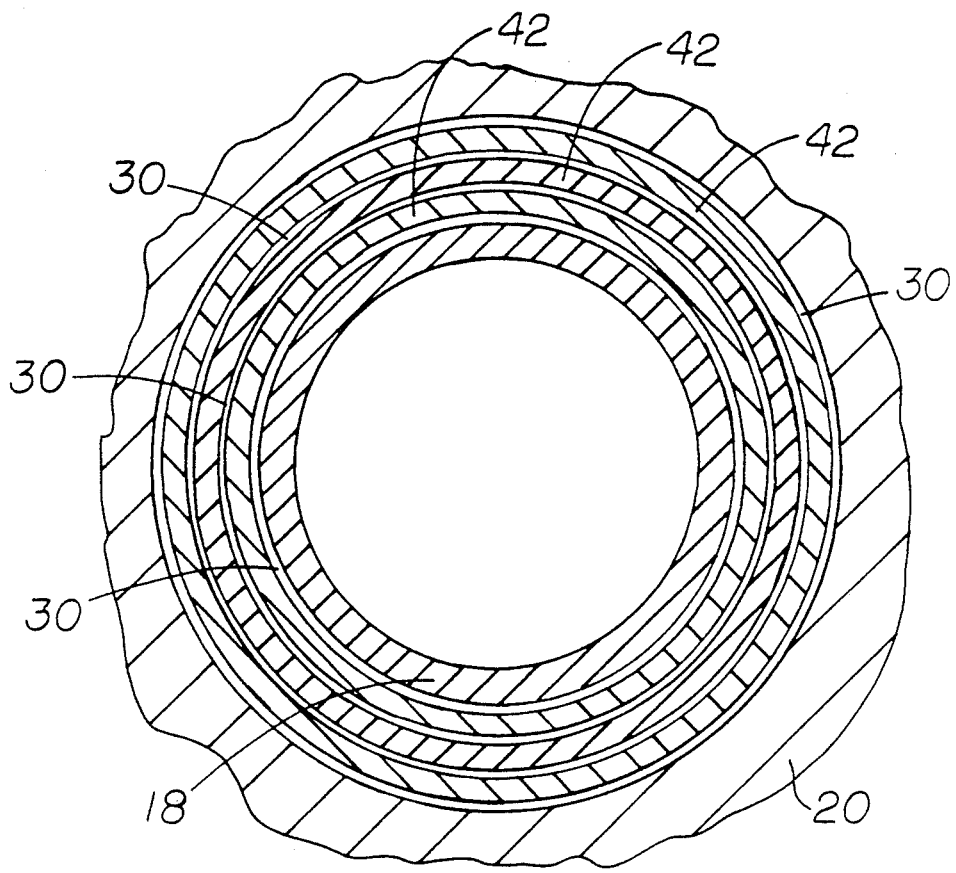
FIG. 5 is a view in section, taken along a line 5—5 in FIG. 4, of the seal assembly and shaft depicted therein.

A different embodiment is shown in FIGS. 4 and 5 in relation to a shaft 18 whose movement is principally reciprocal in nature, as compared to the embodiments in FIGS. 1-3 and 6, wherein the shafts 18 move primarily rotationally. It should be observed from the drawings and from the preceding paragraph that the seal assembly of the present invention can be used in different embodiments for shafts 18 having varying degrees of both rotational and reciprocal movements, for fluids having particular characteristics, and so forth, with the embodiments set forth herein serving primarily as examples of how the seal assembly of the present invention can be adapted to fully meet the needs of a particular application.

In the embodiment of FIGS. 4 and 5, a seal assembly 10c is shown having three concentric floating ring-type seal elements 42 around the circumference of shaft 18 (FIG. 5). The flow through the subchannels 30 created by these elements 42 is axial rather than radial, however, and as a result the end thrust of fluid on these substantially rectangularly cross-sectioned elements 42 tends to push the elements downstream. A bearing face 44 is therefore considered necessary to control this tendency and to keep the elements 42 in place.

As suggested above, whereas the embodiments of FIGS. 1–3 are specifically addressed to providing a seal around a shaft 18 whose principal movement is of a rotational nature, the embodiment of FIGS. 4 and 5 is particularly adapted for use with shafts 18 which move primarily in a reciprocal fashion. The only difference between the use of a seal assembly of the present invention with a rotating shaft 18 and its use with a reciprocating shaft 18 is that in the former use the relative movement and resulting shear will be mostly of a rotational nature, while in the latter the relative movement and resulting shear will be generally axial in nature. The same differences in the speed of the elements by virtue of their positioning relative to a moving flange 16 or shaft 18 and a housing 20 will prevail, and the shear rate maintenance and self-correction seen in earlier embodiments will consequently also be seen in this embodiment.

Figure 6:
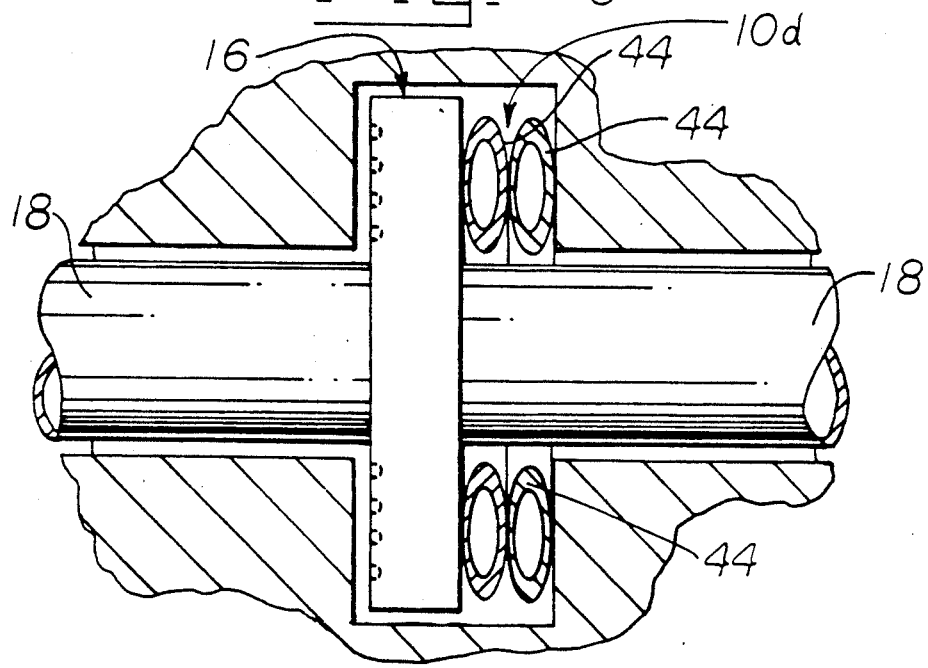
FIG. 6 is a fragmentary cross-sectional view of yet another embodiment of a seal assembly of the present invention in relation to the shaft of FIGS. 1A, 1B and 3.

Another alternative embodiment of the present invention is shown in FIG. 6. The seal assembly 10d of this embodiment is comprised of seal elements 44 which are compressible rings of a hollow elliptical cross-section. An equivalent construction of the elements 44 would have a solid cross-section but would be made of a more compressible elastic material.

The idea behind using such compressible and elastic elements 44 is essentially to constrict the subchannels 30 in the general manner previously employed by the prior art with respect to a single flow channel 28, while allowing for needed increases in the heights of the various subchannels 30 to compensate for sudden movements of the shaft 18 and flange 16.

Regardless of which particular embodiment of the seal assembly of the present invention is used or whether an equivalent embodiment is selected, it can be seen that the seal assemblies of the present invention are well adapted to accomplish the ends for which they have been conceived and designed. Further, as noted earlier, the seal elements may be used by themselves in conjunction with a rotating and/or reciprocating shaft to provide an improved apparatus for manipulating a fluid at least in part by the rotary and/or reciprocal motion of the shaft, or they may complement other sealing means in such apparatus.

Accordingly, while preferred embodiments of the present invention have been described for purposes of explaining the nature and operation of my invention, it will be apparent that numerous variations and permutations of the preferred embodiments can be made which are within the scope and spirit of my invention, as defined by the claims below.

What is claimed is:

1. A process for providing a seal around a relatively movable shaft, comprising the step of at least locally dividing a flow channel defined by an operationally required local clearance h between the shaft and a stationary member associated with the shaft into a plurality of flow subchannels of average dimension $h/n$ $(n-1)$ free floating elements into said flow channel, where n is the number of flow subchannels locally so created.

2. A process as defined in claim 1, wherein:
a flow channel of clearance h or greater is defined around a circumference of the shaft; and
said flow channel is divided into a plurality of concentric flow subchannels around said circumference of said shaft.

3. A process as defined in claim 2, wherein said flow channel is generally annular in configuration.

4. A process as defined in claim 3, wherein:
the number n of concentric flow subchannels is uniform about the circumference of the shaft; and
said n concentric flow subchannels are generally annular in configuration.

5. A process as defined in claim 2, wherein the number n of concentric flow subchannels is uniform around the circumference of the shaft.

6. A process as defined in claim 2, wherein the number n of concentric flow channels is not uniform about the circumference of the shaft.

7. A process for providing a seal around a relatively movable shaft against leakage of a shear-thinning fluid, comprising the steps of:
at least locally dividing a flow channel defined by an operationally required local clearance h between the shaft and a member associated with the shaft into a plurality of flow subchannels of average dimension $h/n$ $(n-1)$ free floating elements into said flow channel, where n is the number of flow subchannels locally so created: and
at least locally expanding one of said flow channel and said plurality of flow subchannels.

8. A seal assembly for use in combination with a relatively movable shaft, comprising means for at least locally dividing a flow channel created by an operationally required local clearance h between the shaft and a stationary member associated with the shaft into a plurality of flow subchannels of average dimension $h/n$ $(n-1)$ free floating elements into said flow channel, where n is the number of flow subchannels locally so created.

9. A seal assembly as defined in claim 8, wherein said free-floating seal elements are substantially identically configured.

10. A seal assembly as defined in claim 9, wherein:
said flow channel is generally annular in configuration:
the number n of flow subchannels is uniform about a circumference of the shaft; and
said $(n-1)$ substantially identically configured free-floating seal elements comprise rings of substantially rectangular cross-section having a smallest inner diameter which exceeds the outer diameter of the shaft defining said flow channel of clearance h in combination with said stationary member.

11. A seal assembly as defined in claim 9, wherein:
said flow channel is generally annular in configuration:
the number n of flow subchannels is uniform about a circumference of the shaft: and
said $(n-1)$ substantially identically configured free-floating seal elements comprise rings of a cross-sectional configuration which has a central substantially rectangular portion with tapered end portions, said rings having a smallest inner diameter which exceeds the outer diameter of the shaft defining said flow channel of clearance h in combination with said stationary member.

12. A seal assembly as defined in claim 11, wherein said tapered end portions are substantially symmetrically tapered.

13. A seal assembly as defined in claim 9, wherein said (n−1) substantially identically configures free-floating seal elements are of a cross-sectional configuration which has a central substantially rectangular cross-section.

14. A seal assembly as defined in claim 9, wherein said (n−1) substantially identically configured free-floating seal elements are of a cross-sectional configuration which has a central substantially rectangular portion with tapered end portions.

15. A seal assembly as defined in claim 14, wherein said tapered end portions are substantially symmetrical.

16. In an apparatus for manipulating a fluid at least in part by the relative motion of a shaft, the improvement comprising a seal assembly associated with said relatively movable shaft, wherein said seal assembly includes means for at least locally dividing a flow channel defined by an operationally required local clearance h between said shaft and a stationary member associated with said shaft into a plurality of flow subchannels of average dimension h/n (n−1) free floating elements into said flow channel, where n is the number of flow subchannels locally so created.

17. An apparatus as defined in claim 16, wherein said free-floating elements are substantially identically configured.

18. An apparatus as defined in claim 17, wherein:
said flow channel is generally annular in configuration;
the number n of flow subchannels is uniform about a circumference of the shaft; and
said (n−1) substantially identically configured free-floating elements comprise rings of substantially rectangular cross-section having a smallest inner diameter which exceeds the outer diameter of the shaft defining said flow channel of clearance h in combination with said stationary member.

19. An apparatus as defined in claim 17, wherein:
said flow channel is generally annular in configuration;
the number n of flow subchannels is uniform about a circumference of the shaft; and
said (n−1) substantially identically configured free-floating elements comprise rings of a cross-sectional configuration which has a central substantially rectangular portion with tapered end portions, said rings having a smallest inner diameter which exceeds the outer diameter of the shaft defining said flow channel of clearance h in combination with said stationary member.

20. An apparatus as defined in claim 19, wherein said tapered end portions are substantially symmetrically tapered.

21. An apparatus as defined in claim 17, wherein said (n−1) substantially identically configured free-floating elements are of substantially rectangular cross-section.

22. An apparatus as defined in claim 17, wherein said (n−1) identically configured free-floating elements are of a cross-sectional configuration which has a central substantially rectangular portion with tapered end portions.

23. An apparatus as defined in claim 22, wherein said tapered end portions are substantially symmetrically tapered.

* * * * *

UNITED STATES PATENT AND TRADEMARK OFFICE
CERTIFICATE OF CORRECTION

PATENT NO. : 5,046,718

DATED : September 10, 1991

INVENTOR(S) : Robert A. Hay, II

It is certified that error appears in the above-identified patent and that said Letters Patent is hereby corrected as shown below:

Column 8, Claim 1, line 2, insert -- by inserting -- between "h/n" and "(n-1)". Claim 7, line 31, insert -- by inserting -- between "h/n" and "(n-1)"; line 33, delete ":" and replace with -- ; --. Claim 8, lines 41-42, insert -- by inserting -- between "h/n" and "(n-1)". Claim 10, line 50, delete ":" and replace with -- ; --. Claim 11, line 61, delete ":" and replace with -- ; --.

Column 9, Claim 13, line 8, delete "configures" and insert -- configured -- therefor. Claim 16, line 28, insert -- by inserting -- between "h/n" and "(n-1)". Claim 18, line 36, delete ":" and replace with -- ; --.

Signed and Sealed this

Ninth Day of March, 1993

Attest:

STEPHEN G. KUNIN

Attesting Officer

Acting Commissioner of Patents and Trademarks